(12) United States Patent
Nishida

(10) Patent No.: US 8,847,907 B2
(45) Date of Patent: Sep. 30, 2014

(54) DISPLAY DEVICE AND DISPLAY DIRECTION SWITCHING SYSTEM

(75) Inventor: Osamu Nishida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 101 days.

(21) Appl. No.: 13/640,675

(22) PCT Filed: Feb. 1, 2011

(86) PCT No.: PCT/JP2011/052045
§ 371 (c)(1),
(2), (4) Date: Oct. 11, 2012

(87) PCT Pub. No.: WO2011/129136
PCT Pub. Date: Oct. 20, 2011

(65) Prior Publication Data
US 2013/0027356 A1 Jan. 31, 2013

(30) Foreign Application Priority Data

Apr. 15, 2010 (JP) ................................. 2010-094427

(51) Int. Cl.
*G09G 5/00* (2006.01)
*G06F 3/042* (2006.01)

(52) U.S. Cl.
CPC ..................................... *G06F 3/042* (2013.01)
USPC ........ 345/173; 345/175; 345/207; 178/18.09; 178/18.11

(58) Field of Classification Search
CPC . G06F 3/03542; G06F 3/0421; G06F 3/0308; G06F 3/0325; G06F 3/033; G06F 3/042; G09G 2340/0492
USPC ............... 345/173, 175, 179, 207; 178/18.09, 178/18.11, 19.05
See application file for complete search history.

(56) References Cited

U.S. PATENT DOCUMENTS

| | | | |
|---|---|---|---|
| 8,350,829 B2 * | 1/2013 | Miyazaki et al. | ............. 345/175 |
| 2006/0007224 A1 | 1/2006 | Hayashi et al. | |
| 2008/0001927 A1 * | 1/2008 | Yoshida | ........................ 345/173 |

FOREIGN PATENT DOCUMENTS

| | | |
|---|---|---|
| JP | 2001-175376 A | 6/2001 |
| JP | 2002-91700 A | 3/2002 |
| JP | 2003-36142 A | 2/2003 |
| JP | 2006-18219 A | 1/2006 |
| JP | 2007-114820 A | 5/2007 |

* cited by examiner

*Primary Examiner* — Jennifer Nguyen
(74) *Attorney, Agent, or Firm* — Chen Yoshimura LLP

(57) ABSTRACT

Disclosed is a liquid crystal display device that has a function of detecting the position where light emitted from an input pointer 50 has been inputted to an image display surface 10*a* of an display panel and that switches the display direction (vertical direction) of a display image on the display panel on the basis of the radiation direction of the light emitted from the input pointer 50. Thus, a display device having a position detection function that enables the display direction of a display image to be switched using a simple structure can be provided.

10 Claims, 14 Drawing Sheets

(a)

(b)

(a)

(b)

Display Direction Selector Switch

Display Direction Selector Switch

DISPLAY DEVICE AND DISPLAY DIRECTION SWITCHING SYSTEM

TECHNICAL FIELD

The present invention relates to a display device with a position detection function capable of detecting a position where an input was made from the outside, and to a display direction switching system.

BACKGROUND ART

Flat panel display devices such as liquid crystal display devices have advantages such as thin-profile, light-weight, and low power consumption. Also, technologies for improving the display performance thereof such as color display, higher resolution, and video capability have been developed. For this reason, the flat panel display devices are currently used in a wide variety of electronic devices including mobile phones, PDAs, DVD players, mobile gaming devices, laptop computers, PC monitors, and TVs.

Against this background, in recent years, development of a liquid crystal display device in which a photo sensor element is provided in each pixel (or one pixel of RGB pixels) in an image display region (display device with built-in photo sensors) has been sought after. In Patent Document 1, for example, a liquid crystal display device in which photo sensor elements made of photodiodes are formed on a pixel region is disclosed. As described above, by incorporating a photo sensor element in each pixel, it is possible to allow a normal liquid crystal display device to have an area sensor function (specifically, a touch panel function or the like). That is, by using the photo sensor elements, which are incorporated in a display device, as an area sensor, a display device having a function of detecting the position of an input pointer such as an optical stylus can be achieved.

RELATED ART DOCUMENT

Patent Document

Patent Document 1: Japanese Patent Application Laid-Open Publication No. 2006-18219 (Published on Jan. 19, 2006)

SUMMARY OF THE INVENTION

Problems to be Solved by the Invention

Currently, a display device having a display direction switching function that allows a display panel to be operated from multiple directions is proposed. As shown in FIGS. 14 and 15, for example, in a display device in which a display surface of a display panel is disposed to be parallel with a surface of a desk, when a user operates the device from a side A, by turning a display direction selector switch to A, the direction of the display image is switched toward the side A (see FIG. 14). When the user operates the device from a side B, by turning a display direction selector switch to B, the direction of the display image is switched toward the side B (see FIG. 15). Therefore, by providing four positions to the display direction selector switch, for example, the display device can be operated from the four directions according to the selection the user makes to the switch. When such a display device having the display direction switching function is provided with the position detection function described above, the applicability of the display device can be made broader.

However, because the above-mentioned display device requires an additional component such as a selector switch for switching the display directions, it goes against the trend toward a thinner and lighter device. Also, the user needs to perform the switching operation every time he/she wants to change the direction, which makes the device less user-friendly.

The present invention was made in view of the above-mentioned problems, and is aiming at providing a display device having a position detection function and a display direction switching system that can switch display directions of a display image using a simple configuration.

Means for Solving the Problems

In order to solve the above-mentioned problems, a display device according to the present invention has a function of detecting a position on an image display surface of a display panel where light emitted from an input pointer is inputted, wherein a display direction of a display image on the display panel is switched on the basis of a radiation direction of the light emitted from the input pointer.

According to this configuration, the display direction of the display image can be switched in accordance with the radiation direction of light emitted from the input pointer, and therefore, it is possible to make the radiation direction of the light emitted from the input pointer and the display direction of the display image coincide with each other, for example. That is, regardless of the direction from which the user of the input pointer uses the display device, the display image can always be displayed toward the user. As described above, in the display device according to the present invention, the display direction of the display image can automatically be switched without using a selector switch or the like, which was required in the conventional configuration, and as a result, the configuration of the display device can be simplified. A relationship between the radiation direction of light and the display direction of a display image is not limited to a specific relationship, and can be determined in accordance with the usage of the display device.

The display device according to the present invention may also be configured such that, when the display direction of a display image in normal viewing is a vertical direction, the radiation direction of light emitted from the input pointer and the vertical direction of the display image in the display panel are made to coincide with each other.

The display device according to the present invention may also be configured such that the input pointer is located at the bottom side of the display image in the display panel.

The display device according to the present invention may also be configured such that the display direction of the display image in the display panel is switched further based on a region from which light of the input pointer is emitted, when a surrounding area of the display panel is divided into prescribed regions.

The display device according to the present invention may also be configured such that, when light from the input pointer is emitted from an individual region, the display direction of a display image in the display panel is set to the same direction.

According to this configuration, when the user operates the device from a certain position (within the same region), for example, whether the user holds the input pointer with his/her left hand or right hand, the display direction of the display image is not changed, and the display image can be displayed toward the user. As described above, even when the orientation of the input pointer is changed within the same region, the orientation of the display image can be maintained the same.

The display device according to the present invention may also be configured to include: a plurality of photo sensor elements arranged in a matrix so as to correspond to an image display surface of the display panel; a coordinate detecting section that detects positions on an array of the respective photo sensor elements arranged in a matrix where an input from the input pointer was received; a received light intensity detecting section that detects intensities of light received by the photo sensor elements; a coordinate and intensity combining section that derives intensities of received light at respective coordinate positions by combining the coordinates of input positions, which were obtained by the coordinate detecting section, and the intensities of light received at the coordinates, which were obtained by the received light intensity detecting section; an input position detecting section that derives coordinates of a center of gravity of a light radiation region on the image display surface based on information of the received light intensities obtained by the coordinate and intensity combining section; a radiation direction determining section that determines a radiation direction of light emitted from the input pointer based on the coordinates of the center of gravity derived by the input position detecting section; and a display direction switching section that switches a display direction of a display image based on the light radiation direction determined by the radiation direction determining section.

Alternatively, the display device according to the present invention may be configured to includes: a plurality of photo sensor elements arranged in a matrix so as to correspond to an image display surface of the display panel; a coordinate detecting section that detects positions on an array of the respective photo sensor elements arranged in a matrix, at which an input from the input pointer was received; a received light intensity detecting section that detects intensities of light received by the photo sensor elements; a coordinate and intensity combining section that derives intensities of received light at respective coordinate positions by combining the coordinates of input positions, which were obtained by the coordinate detecting section, and the intensities of light received at the coordinates, which were obtained by the received light intensity detecting section; an input position detecting section that derives coordinates of a center of gravity of a light radiation region on the image display surface based on information of the received light intensities obtained by the coordinate and intensity combining section; a radiation direction determining section that determines a radiation direction of light emitted from the input pointer based on the coordinates of the center of gravity, which were derived by the input position detecting section; a region determining section that determines, among a plurality of regions that have been divided in advance, a region from which light of the input pointer was emitted, based on the light radiation direction that was determined by the radiation direction determining section, when a surrounding area of the display panel is divided into prescribed regions; and a display direction switching section that switches a display direction of a display image based on a result obtained by the region determining section.

Alternatively, the display device according to the present invention may be configured to include: a plurality of photo sensor elements arranged in a matrix so as to correspond to an image display surface of the display panel; a coordinate detecting section that detects positions on an array of the respective photo sensor elements arranged in a matrix, at which an input from the input pointer was received; a received light intensity detecting section that detects intensities of light received by the photo sensor elements; a coordinate and intensity combining section that derives intensities of received light at respective coordinate positions by combining the coordinates of input positions, which were obtained by the coordinate detecting section, and the intensities of light received at the coordinates, which were obtained by the received light intensity detecting section; an input position detecting section that derives coordinates with a highest received light intensity based on information of the received light intensities obtained by the coordinate and intensity combining section; a radiation direction determining section that determines a radiation direction of light emitted from the input pointer based on the coordinates derived by the input position detecting section; and a display direction switching section that switches a display direction of a display image based on the light radiation direction determined by the radiation direction determining section.

In this configuration, the position of the input pointer (radiation direction of light) is determined based on the coordinates of the point having the highest intensity (peak coordinates) among the respective received light intensities in the radiation region. With this configuration, the display direction of the display image can also be switched using a simple configuration.

The display device according to the present invention may also be configured such that the photo sensor elements may be infrared sensor elements that detect infrared light.

The display device according to the present invention may also be configured such that the input position detecting section determines the radiation region as a region formed by a group of coordinates where the light intensities, which were obtained by the coordinate and intensity combining section, are equal to or greater than a threshold value.

In order to solve the above-mentioned problems, a display direction switching system according to the present invention includes any one of the display devices described above and an input pointer that performs an input by radiating light to the display device.

Because the display direction switching system of the present invention is equipped with the display device configured in the above-mentioned manner, it is possible to switch the display direction of the display image using a simple configuration.

Effects of the Invention

As described above, in the display device and the display direction switching system according to the present invention, the display direction of the display image in the display panel is switched on the basis of the radiation direction of light emitted from the input pointer.

This makes it possible to automatically switch the display direction of the display image without using a selector switch or the like, which was required in the conventional configuration, and therefore, a display device with a position detection function and a display direction switching system that make it possible to switch the display direction of a display image using a simple configuration can be provided.

DETAILED DESCRIPTION OF EMBODIMENTS

<Embodiment 1>

Embodiment 1 of the present invention will be explained below with reference to FIGS. 1 to 9, but the present invention is not limited to such.

In the present embodiment, a liquid crystal display device that has photo sensor elements formed in a pixel region thereof and that is equipped with an area sensor function (position detection function) will be explained as an example of the display device of the present invention. Also, in the present embodiment, a non-contact type display direction switching system constituted of the liquid crystal display device and a laser pointer performing an input thereto will be explained.

Figure 2:
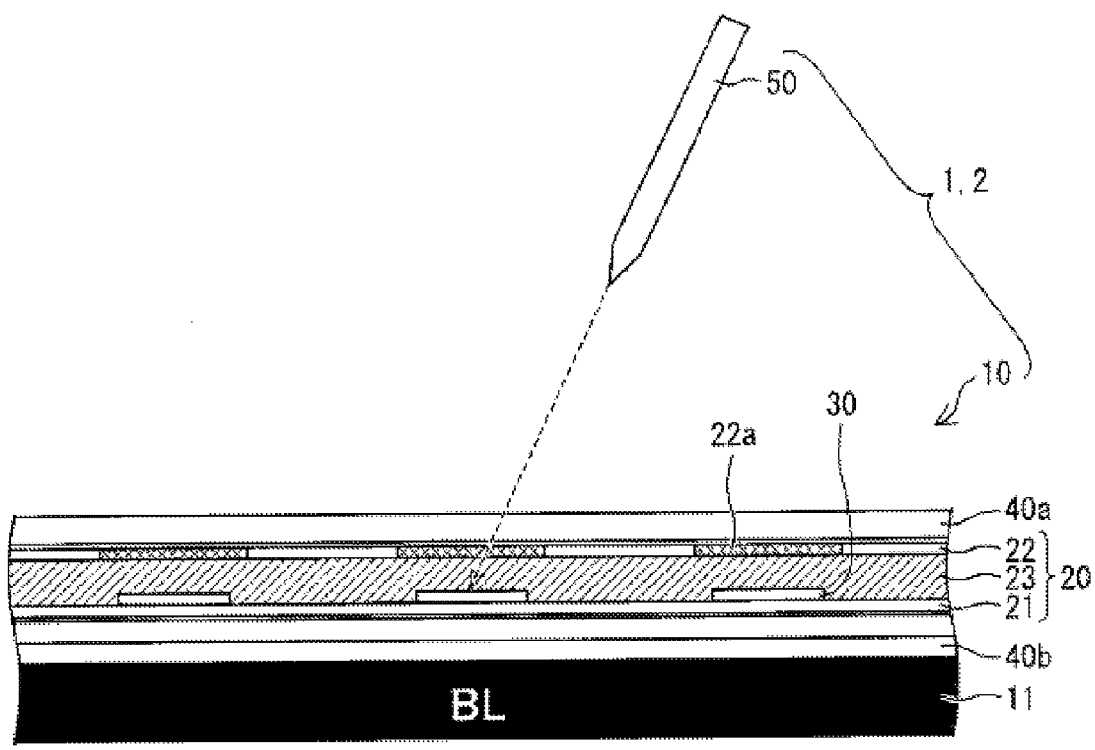
FIG. 2 is a schematic diagram showing a configuration of the display direction switching system of the present invention.
Figure 3:
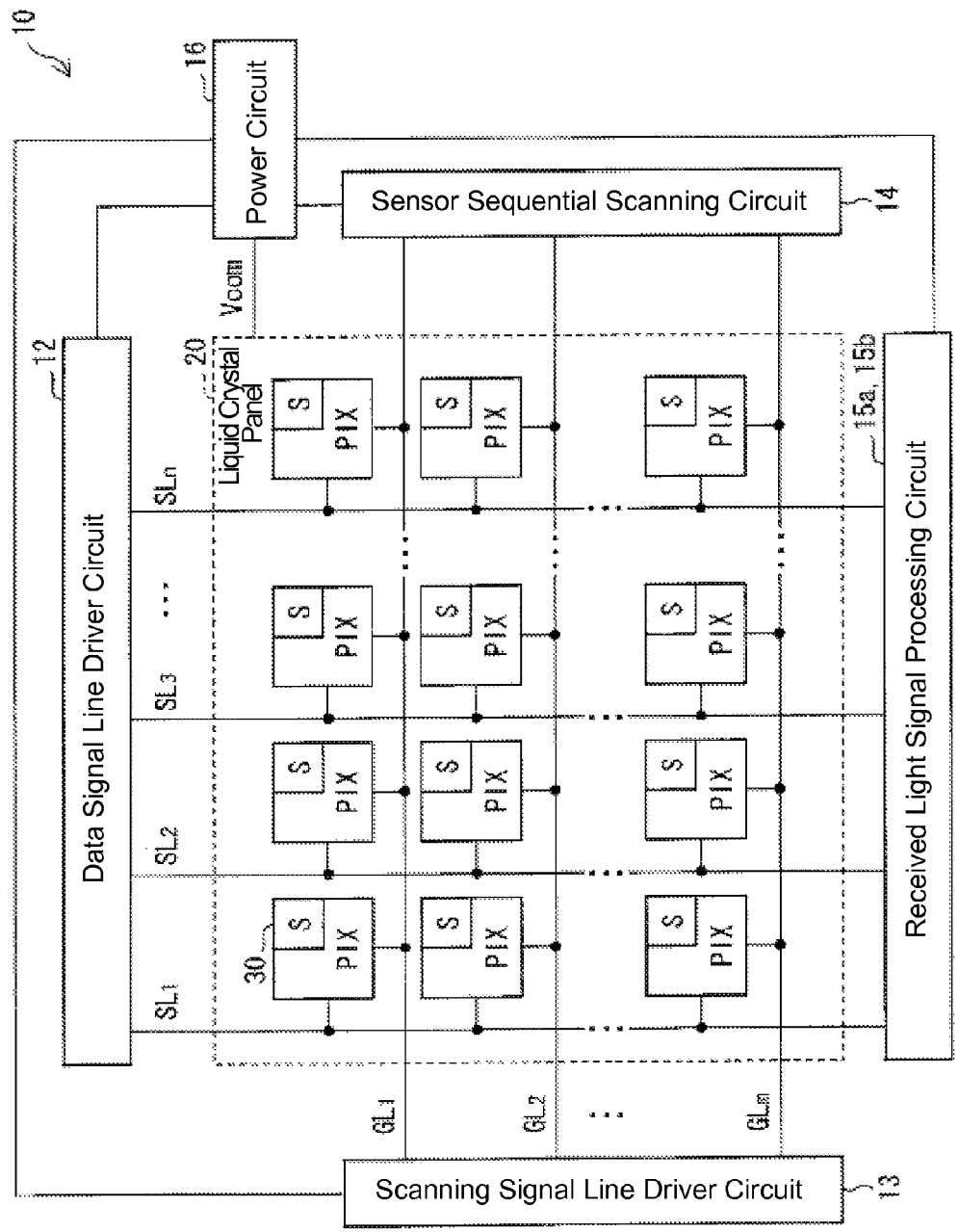
FIG. 3 is a block diagram showing a configuration of a liquid crystal display device constituting the display direction switching system of Embodiment 1.
Figure 4:
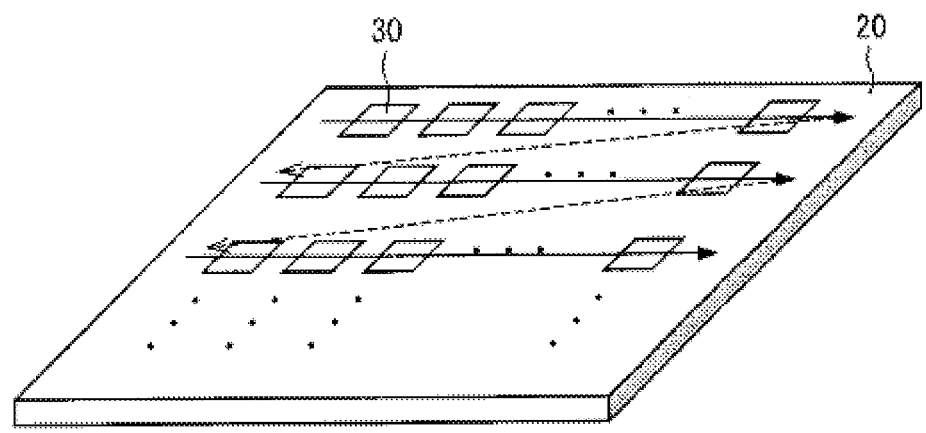
FIG. 4 is a schematic diagram showing a process of sequentially scanning photo sensor elements arranged in a matrix in a liquid crystal panel in the liquid crystal display device shown in FIG. 3.

In FIG. 2, a configuration of a display direction switching system 1 constituted of a liquid crystal display device 10 (display device) and a laser pointer 50 (input pointer) is shown. In FIG. 3, a configuration of the liquid crystal display device 10 with an area sensor function (may also be simply referred to as the liquid crystal display device 10) of the present embodiment is shown. FIG. 2 is a schematic cross-sectional view of the configuration of the liquid crystal display device 10, and FIG. 3 schematically shows a configuration of an image display region of the liquid crystal display device 10 in a plan view.

As shown in FIG. 2, the liquid crystal display device 10 of the present embodiment includes a liquid crystal panel 20 (display panel) and a backlight 11 that is disposed to face the rear surface of the liquid crystal panel 20 and that emits light to the liquid crystal panel 20.

The liquid crystal panel 20 is configured to have an active matrix substrate 21 having a large number of pixels arranged in a matrix, an opposite substrate 22 disposed to face the active matrix substrate 21, and a liquid crystal layer 23 sandwiched between these two substrates as a display medium.

A front side polarizing plate 40a and a rear side polarizing plate 40b are respectively provided on outer surfaces of the liquid crystal panel 20 so as to sandwich the liquid crystal panel 20.

The respective polarizing plates 40a and 40b serve as polarizers. When liquid crystal materials sealed in the liquid crystal layer are of a vertical alignment type, for example, by arranging the polarizing direction of the front side polarizing plate 40a and the polarizing direction of the rear side polarizing plate 40b in a cross Nicols state to each other, a normally black mode liquid crystal display device can be achieved.

The active matrix substrate 21 includes TFTs (not shown), which are switching elements for driving the respective pixels, an alignment film (not shown), photo sensor elements 30, and the like.

Although not shown in the figure, the opposite substrate 22 has a color filter layer, an opposite electrode, an alignment film, and the like formed therein. The color filter layer is constituted of colored sections having respective colors of red (R), green (G), and blue (B), and a black matrix. The opposite substrate 22 includes optical filters 22a that block visible light and that selectively transmit infrared light in positions corresponding to regions where the photo sensor elements 30 are disposed.

The backlight 11 emits light to the liquid crystal panel 20. In the present embodiment, the backlight 11 uses white LEDs or the like as a light source, thereby emitting white light to the liquid crystal panel 20.

The laser pointer 50 is provided to perform an input to a specific position on the image display surface of the liquid crystal display device 10. The laser pointer 50 emits infrared light of a prescribed intensity from the tip thereof.

As described above, in the liquid crystal display device 10 of the present embodiment, the photo sensor elements 30 that detect infrared light are provided in the respective pixel regions, thereby achieving an area sensor function. By detecting infrared light emitted from the tip of the laser pointer 50 through the photo sensor elements 30, the liquid crystal display device 10 can receive information inputted thereto or perform intended operations. Specifically, in the liquid crystal display device 10 of the present embodiment, based on the detection results of the photo sensor elements 30, for example, an operation of switching the direction of a display image (display direction) to a desired direction is performed. The operation of switching the display direction will be later described.

Next, a specific configuration of the photo sensor elements 30 will be explained below.

The photo sensor elements 30 are photoelectric conversion elements that detect the received light amount (received light intensity) by generating a current in accordance with the intensity of received light. The photo sensor elements 30 are made of photodiodes or phototransistors. The TFTs and the photo sensor elements 30 may be formed integrally on the active matrix substrate 21 through the substantially same process. That is, some of the constituting members of the photo sensor elements 30 may be formed simultaneously with some of the constituting members of the TFTs. Such photo sensor elements can be formed by a known method of manufacturing a liquid crystal display device having built-in photo sensor elements.

As shown in FIG. 2, in the opposite substrate 22, the optical filters 22a that block visible light are formed in positions that correspond to regions where the photo sensor elements 30 are disposed. The optical filters 22a are formed in the color filter layer, and each has a laminated structure of a red color filter and a blue color filter, which form the colored sections of the color filter layer. This makes it possible to block a visible light component out of components of light that enters the photo sensor elements 30. As a result of the optical filters 22a described above, the photo sensor elements 30 selectively receive only an infrared light component out of the light that enters the image display surface of the liquid crystal panel 20, which allows the photo sensor elements 30 to detect the intensity of infrared light.

As described above, the photo sensor element 30 and the optical filter 22a are combined to detect the intensity of infrared light, and therefore, this combination may also be referred to as an infrared sensor element.

The optical filter 22a is not limited to the above-mentioned filter, and any filter may be used as long as it has functions of blocking all components (visible light and the like, for example) but the infrared light among the components of light that entered the photo sensor elements 30, and selectively transmitting the infrared light only. That is, as the optical filter 22a, known optical filters that selectively transmit infrared light can be used. In the present embodiment, the optical filters 22a are incorporated in the color filter layer, but the present invention is not limited to such a configuration, and the optical filters 22a that selectively transmit infrared light may be directly laminated on light-receiving sections of the photo sensor elements 30.

When the photo sensor elements 30 have a function of selectively receiving infrared light, the optical filters 22a are not necessarily required. As the photo sensor elements 30 that have a function of selectively receiving infrared light, known photo sensor elements can be employed.

The light emitted from the laser pointer 50 is not limited to infrared light, and may be visible light. In this case, photo sensor elements that can detect the intensity of light having the corresponding wavelength (that is, photo sensor elements that can detect the intensity of visible light) are to be used as the photo sensor elements 30. As the photo sensor elements that can detect the intensity of visible light, known photo sensor elements can be employed.

Next, a configuration of the liquid crystal panel 20 in the liquid crystal display device 10 in a plan view will be explained with reference to FIG. 3.

As shown in FIG. 3, the liquid crystal panel 20 includes a plurality of pixels PIX arranged in a matrix. The liquid crystal panel 20 further includes "n" number of data signal lines SL1 to SLn and "m" number of scanning signal lines GL1 to GLm that intersect with the respective data signal lines SL1 to SLn. The pixels PIX are provided near respective intersections of the data signal lines SL1 to SLn and the scanning signal lines GL1 to GLm, respectively. Each of the pixels PIX is formed in a section that is enclosed by two adjacent data signal lines SLi and SLi+1 and two adjacent scanning signal lines GLj and GLj+1.

As shown in FIG. 3, the liquid crystal display device 10 is provided with a data signal line driver circuit 12 that supplies data signals to the respective pixels PIX through the data signal lines SL1 to SLn, and a scanning signal line driver circuit 13 that supplies a scanning signal to the respective pixels PIX through the scanning signal lines GL1 to GLm. This way, an image can be displayed in accordance with image signals that represent display states of the respective pixels PIX.

The liquid crystal panel 20 further includes photo sensor elements (S: will be omitted below) 30 that are provided in the respective pixels PIX one by one. That is, in a manner similar to the respective pixels PIX, the photo sensor elements 30 are arranged in a matrix in the image display region.

The liquid crystal display device 10 further includes a sensor sequential scanning circuit 14, a received light signal processing circuit 15a, and a power circuit 16. The sensor sequential scanning circuit 14 sequentially selects the photo sensor elements 30 arranged in a matrix at prescribed intervals through the respective scanning signal lines GL1 to GLm (see FIG. 4). The received light signal processing circuit 15a reads out received light signals through the respective data signal lines SL1 to SLn from the photo sensor elements 30 that are sequentially selected by the sensor sequential scanning circuit 14, and based on the signals that have been read out, performs a process of detecting a position (coordinates) pointed by the laser pointer 50 and a process of switching the display direction of the display image. The power circuit 16 supplies power to the respective circuits 12, 13, 14, and 15a, and supplies a common potential Vcom to the opposite substrate 22 of the liquid crystal panel 20.

With the above-mentioned configuration, the liquid crystal display device 10 of the present embodiment has a function of sequentially scanning the photo sensor elements 30 provided in the respective pixels, detecting a radiation region of infrared light on the image display surface, thereby identifying the radiation direction of infrared light emitted from the laser pointer 50, and switching the display direction of the display image based on the identified radiation direction.

In the present invention, the photo sensor element 30 may not necessarily be provided in each pixel. The photo sensor element 30 may be provided in one color pixel in each set of three color pixels of R, G, and B, for example.

Next, an internal configuration of the laser pointer 50 will be explained with reference to FIG. 5.

Figure 5:
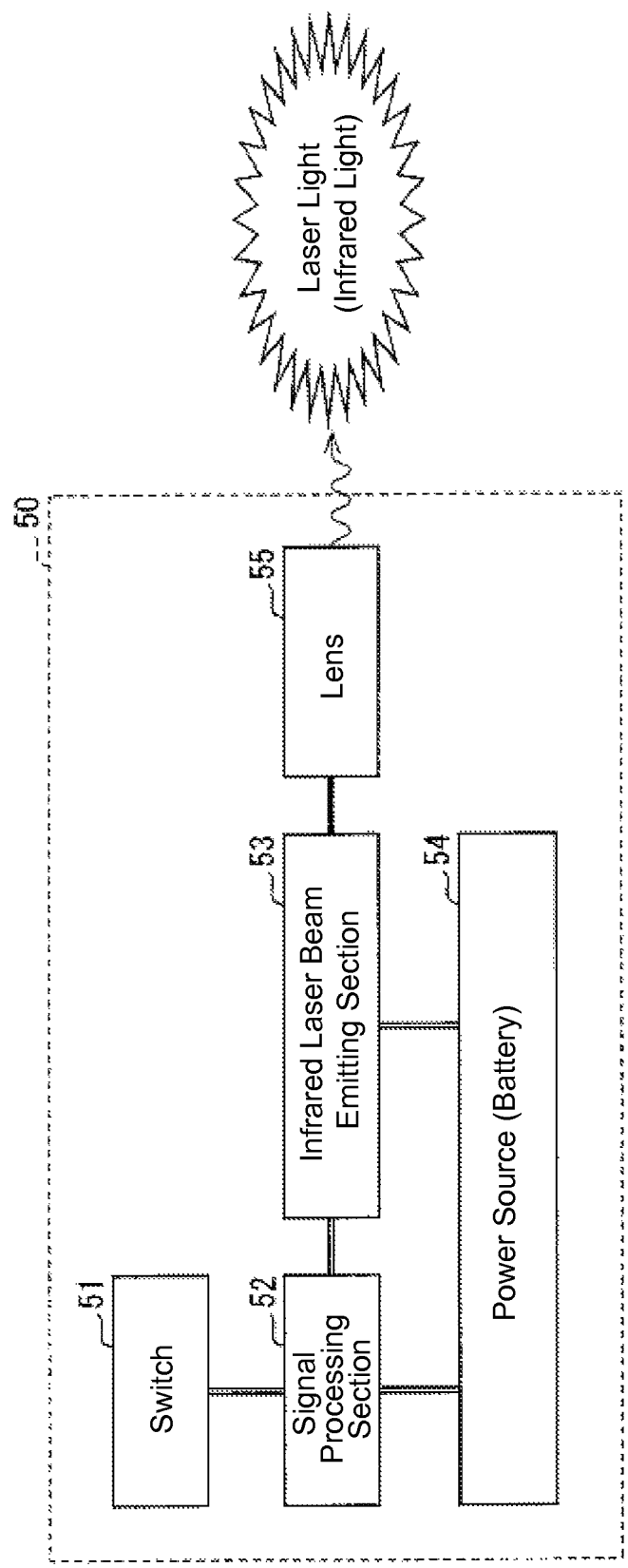
FIG. 5 is a block diagram showing a configuration of a laser pointer (input pointer) constituting the display direction switching system of Embodiment 1.

As shown in FIG. 5, the laser pointer 50 includes a switch 51, a signal processing section 52, an infrared laser beam emitting section 53 (infrared light outputting section), a power source (battery) 54, a lens 55, and the like.

In this laser pointer 50, upon detecting the switch 51 being turned on, the signal processing section 52 instructs the infrared laser beam emitting section 53 to output an infrared laser beam of a prescribed intensity. The laser beam (infrared light) emitted from the infrared laser beam emitting section 53 is diffused at prescribed angles by the lens 55. However, the lens 55 is not an essential component of the present invention, and therefore may not be provided. The power source (battery) 54 supplies power to the signal processing section 52 and the infrared laser beam emitting section 53.

Figure 1:
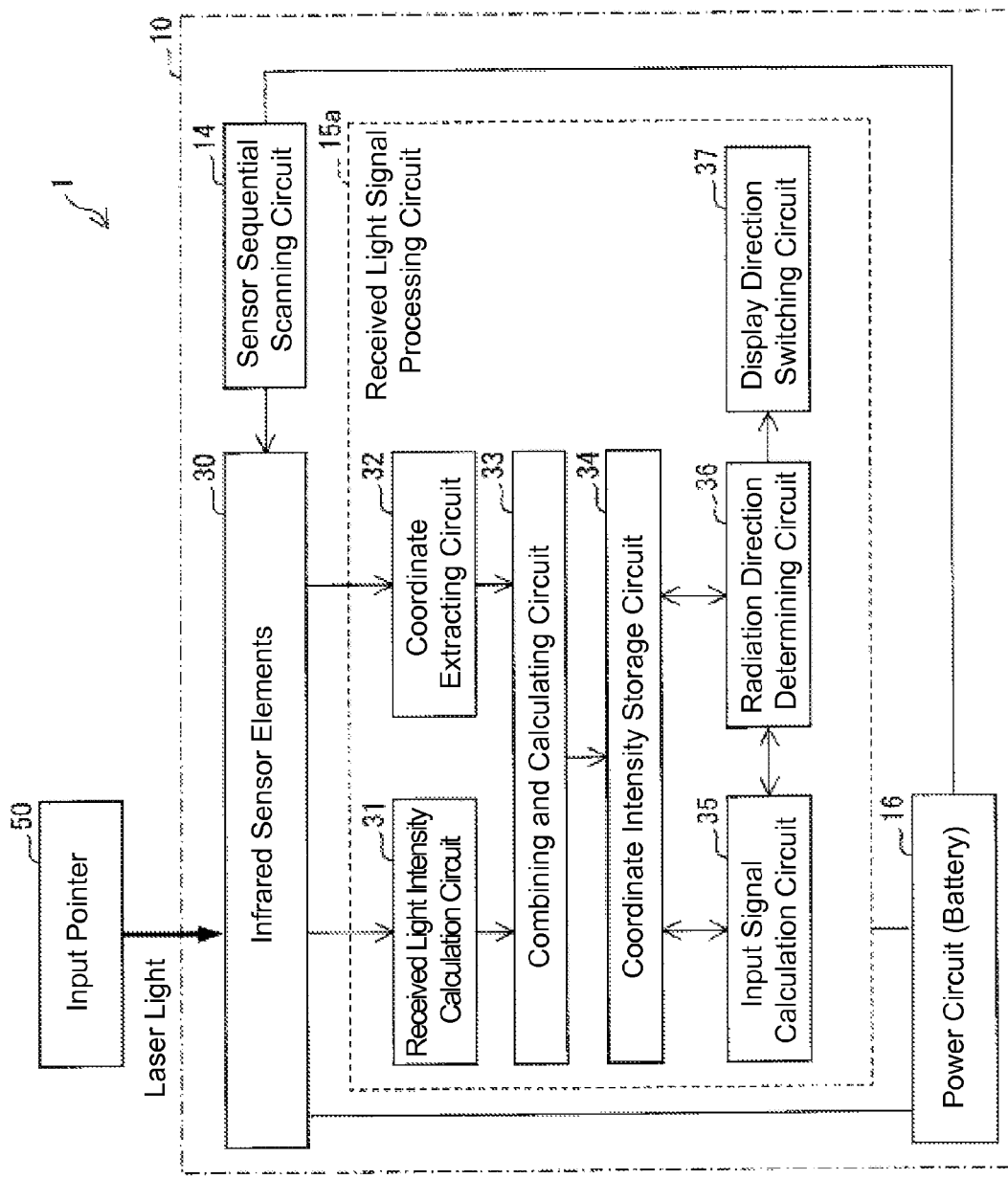
FIG. 1 is a block diagram showing a configuration for switching a display direction in a display direction switching system according to Embodiment 1.

Next, a configuration for switching the display direction of a display image in the display direction switching system 1 of the present embodiment will be described with reference to FIG. 1.

As described above, the respective photo sensor elements 30 (infrared sensor elements) provided in the liquid crystal panel 20 are sequentially selected by the sensor sequential scanning circuit 14 through the respective scanning signal lines GL1 to GLm. The received light signal processing circuit 15a reads out received light signals through the respective data signal lines SL1 to SLn from the photo sensor elements 30 that are sequentially selected by the sensor sequential scanning circuit 14, and performs various processes to the signals that have been read out. The power circuit 16 supplies power to the respective photo sensor elements 30, the sensor sequential scanning circuit 14, and the received light signal processing circuit 15a. The power circuit 16 may be a battery.

The received light signal processing circuit 15a includes a received light intensity calculation circuit 31 (received light intensity detecting section), a coordinate extracting circuit 32 (coordinate detecting section), a combining and calculating circuit 33 (coordinate and intensity combining section), a coordinate intensity storage circuit 34, an input signal calculation circuit 35 (input position detecting section), a radiation direction determining circuit 36 (radiation direction determining section), and a display direction switching circuit 36 (display direction switching section).

The received light intensity calculation circuit 31 derives intensities of infrared light from the laser pointer 50, which was received by the respective photo sensor elements 30, based on the received light signals (current values that correspond to the intensities of the received light) sent from the respective photo sensor elements 30.

The coordinate extracting circuit 32 extracts positions of the respective photo sensor elements 30 that are sequentially selected by the sensor sequential scanning circuit 14 on the matrix array, i.e., respective coordinate positions on the plane.

The combining and calculating circuit 33 combines the intensities of infrared light derived by the received light intensity calculation circuit 31 and the coordinate positions extracted by the coordinate extracting circuit 32, and derives intensities of received infrared light at the respective coordinate positions, respectively.

The coordinate intensity storage circuit 34 obtains the intensities of the light received by the respective photo sensor elements 30, which were derived by the combining and calculating circuit 33, and stores the intensities of the received light at the respective coordinate positions.

The input signal calculation circuit 35 derives, based on the information stored in the coordinate intensity storage circuit 34, coordinates of the circumference of a radiation region formed by a group of photo sensor elements 30 (coordinate group) having the received light intensities equal to or greater than a prescribed value (threshold value) among the photo sensor elements 30 arranged in a matrix, and derives coordinates of the center of gravity of the radiation region based on the coordinates of the circumference. In addition to the coordinates of the center of gravity of the radiation region, the input signal calculation circuit 35 derives coordinates of the furthest circumference point, which is a point furthest from the center of gravity in the radiation region, and coordinates of the closest circumference point, which is a point on the line running through the center of gravity and the furthest circumference point and that is closest to the center of gravity in the radiation region. These calculations are performed every time a scan of the entire photo sensor elements 30 is conducted by the sensor sequential scanning circuit 14 (in every scan), and therefore, the respective sets of coordinates of the center of gravity, the furthest circumference point, and the closest circumference point of the radiation region can be obtained in every scan. The coordinates of the center of gravity of the radiation region can be derived by a known method.

The radiation direction determining circuit 36 determines a radiation direction of infrared light emitted from the laser pointer 50 based on the respective sets of coordinates of the center of gravity, the furthest circumference point, and the closest circumference point, which were derived by the input signal calculation circuit 35. Specifically, it is determined that, in a plan view of the image display surface 10a, the laser pointer 50 is located on the side closer to the closest circumference point from the center of gravity (on the extended line of the line running through the center of gravity and the closest circumference point), and the light was radiated in a direction from the closest circumference point toward the furthest circumference point.

The display direction switching circuit 37 switches the display direction of the display image based on the results determined by the radiation direction determining circuit 36. Specifically, when the display direction of the display image in normal viewing is the vertical direction, the display direction is switched such that the furthest circumference point comes to the top side of the image and the closest circumference point comes to the bottom side, for example. Alternatively, the display direction may be switched such that the furthest circumference point comes to the bottom and the closest circumference point comes to the top.

Next, a method of switching the display direction in the display direction switching system 1 of the present embodiment will be explained.

Figure 6:
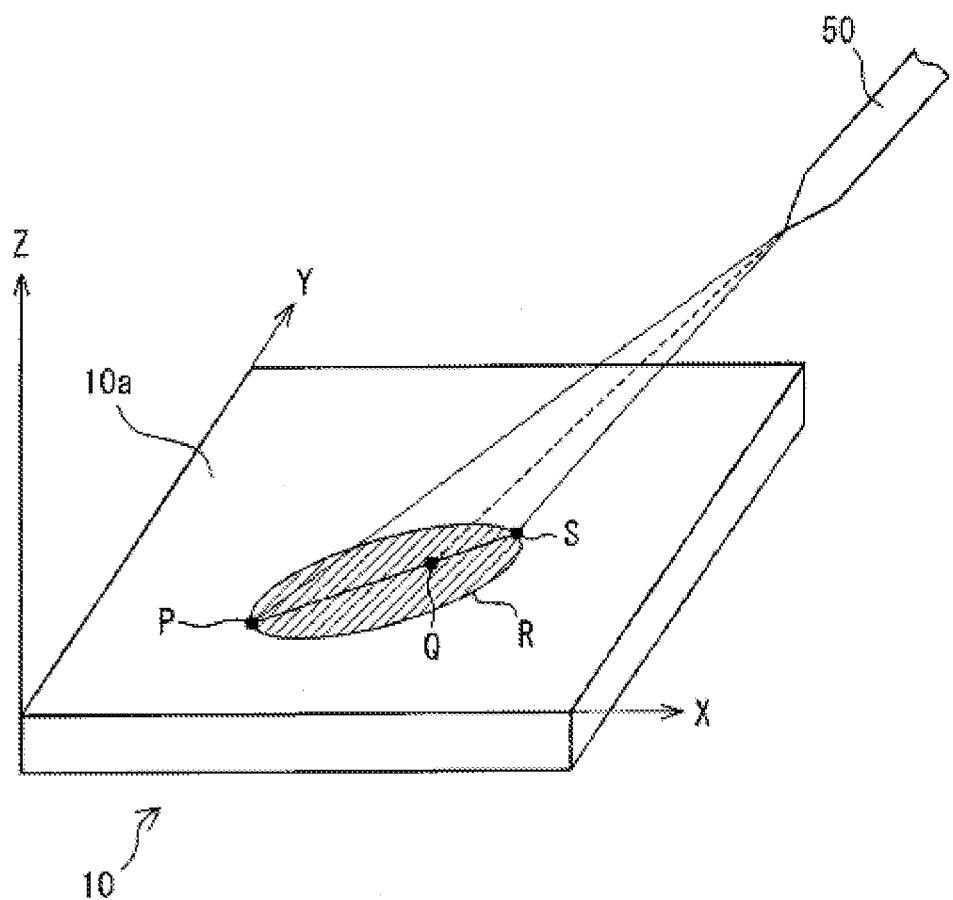
FIG. 6 is a schematic diagram showing a process of switching the display direction in the display direction switching system of Embodiment 1.

FIG. 6 is a schematic view showing a process of switching the display direction in the display direction switching system 1. As shown in FIG. 6, in the display direction switching system 1, the photo sensor elements 30 in the liquid crystal display device 10 detect laser light (infrared light) emitted from the laser pointer 50 that is located remotely from the image display surface 10a of the liquid crystal display device 10, thereby detecting the radiation direction of the infrared light.

FIG. 6 schematically shows a radiation region when the liquid crystal display device 10 is radiated by the laser pointer 50.

Here, a process flow for switching the display direction of the display image at a point in time (t1) will be explained with reference to FIGS. 6 and 7.

Figure 7:
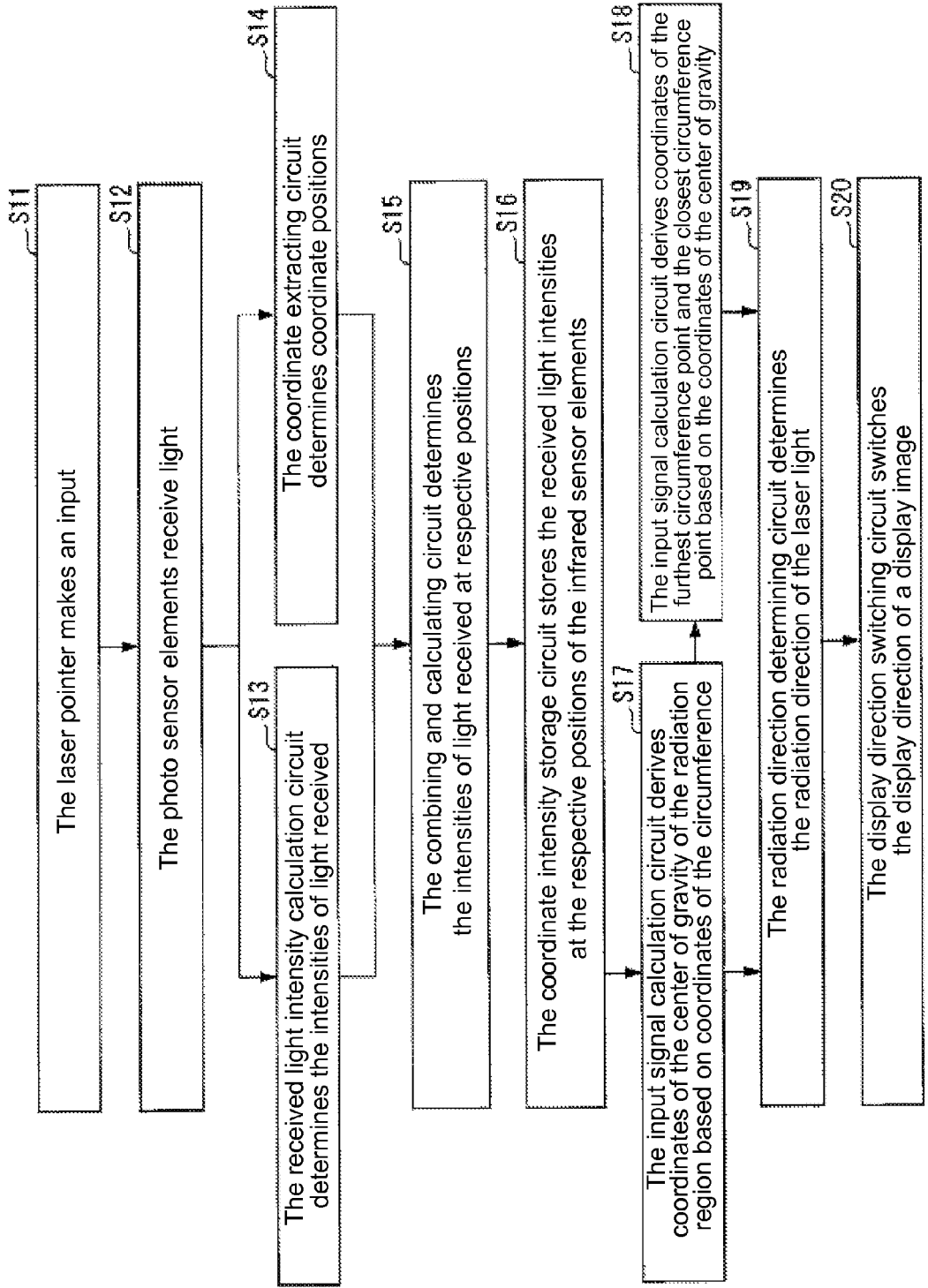
FIG. 7 is a flowchart showing a process flow for switching the display direction in the display direction switching system of Embodiment 1.

As shown in FIG. 6, when laser light (infrared light) is radiated to the image display surface 10a of the liquid crystal display device 10 from the laser pointer 50 at a point in time, the liquid crystal display device 10 receives an input from the laser pointer 50 (step S11) as shown in FIG. 7. At this time, in the liquid crystal display device 10, a sensing operation is performed by the respective photo sensor elements 30 (infrared sensor elements) that are sequentially selected by the sensor sequential scanning circuit 14, and received light signals are generated based on the amount of infrared light that has been radiated (step S12). The received light signals of the respective photo sensor elements 30 obtained in each scan by the sensor sequential scanning circuit 14 are sent to the received light signal processing circuit 15a sequentially.

In the received light signal processing circuit 15a, first, the received light intensity calculation circuit 31 derives the intensities of the received infrared light based on the received light signals that have been provided (step S13). Simultaneously with this step, the coordinate extracting circuit 32 determines coordinate positions from which the respective received light signals were sent as a result of the scan by the sensor sequential scanning circuit 14 (step S14).

Subsequently, the combining and calculating circuit 33 combines the calculation results of the infrared intensities in the received light intensity calculation circuit 31 and the coordinate positions determined by the coordinate extracting circuit 32, and determines the intensities of infrared light at the respective coordinate positions (step S15). The coordinate intensity storage circuit 34 obtains the intensities of light received by the respective photo sensor elements 30, which were derived by the combining and calculating circuit 33, and stores the received light intensities at the respective coordinate positions (step S16).

Next, the input signal calculation circuit 35 derives, based on the information stored in the coordinate intensity storage circuit 34, coordinates of a circumference of a radiation region R formed by a group of photo sensor elements 30 having the received light intensities equal to or greater than a prescribed value (threshold value) among the photo sensor elements 30 arranged in a matrix, and derives coordinates of the center of gravity Q of the radiation region R based on the coordinates of the circumference (step S17). The input signal calculation circuit 35 also derives coordinates of the furthest circumference point P, which is a point that is furthest from the center of gravity Q in the radiation region R, and coordinates of the closest circumference point S, which is a point that is on the line running through the center of gravity Q and the furthest circumference point P and that is closest to the center of gravity Q in the radiation region R, based on the coordinates of the center of gravity Q in the radiation region R (step S18).

Next, the radiation direction determining circuit 36 determines a radiation direction of the laser light based on the center of gravity Q, the furthest circumference point P, and the closest circumference point S, which were derived by the input signal calculation circuit 35 (step S19). For example, the radiation direction determining circuit 36 determines that the laser pointer 50 is located on the side closer to the closest circumference point S from the center of gravity Q, and the light was radiated in a direction from the closest circumference point S toward the furthest circumference point P. The display direction switching circuit 37 thereafter switches the display direction of the display image based on the results determined by the radiation direction determining circuit 36 (step S20). The display direction is switched such that the furthest circumference point P comes to the top and the closest circumference point S comes to the bottom, for example.

Figure 8:
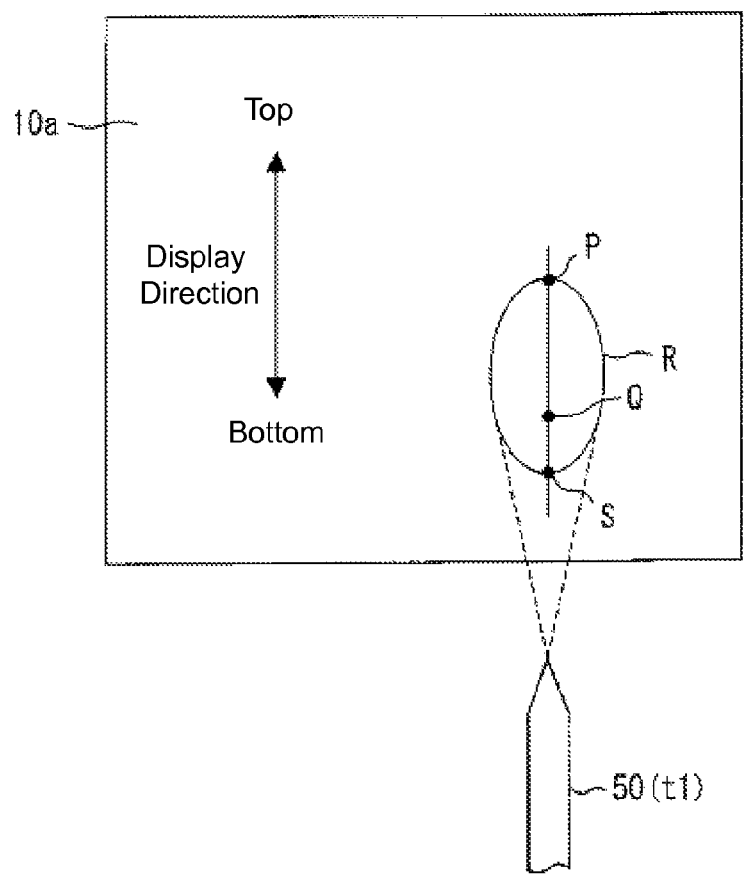
FIG. 8(a) is a schematic diagram showing a manner of switching a display direction with a laser pointer at a time t1 in the display direction switching system of Embodiment 1.
FIG. 8(b) is a schematic diagram showing a manner of switching a display direction with a laser pointer at a time t2 in the display direction switching system of Embodiment 1.
Figure 8:
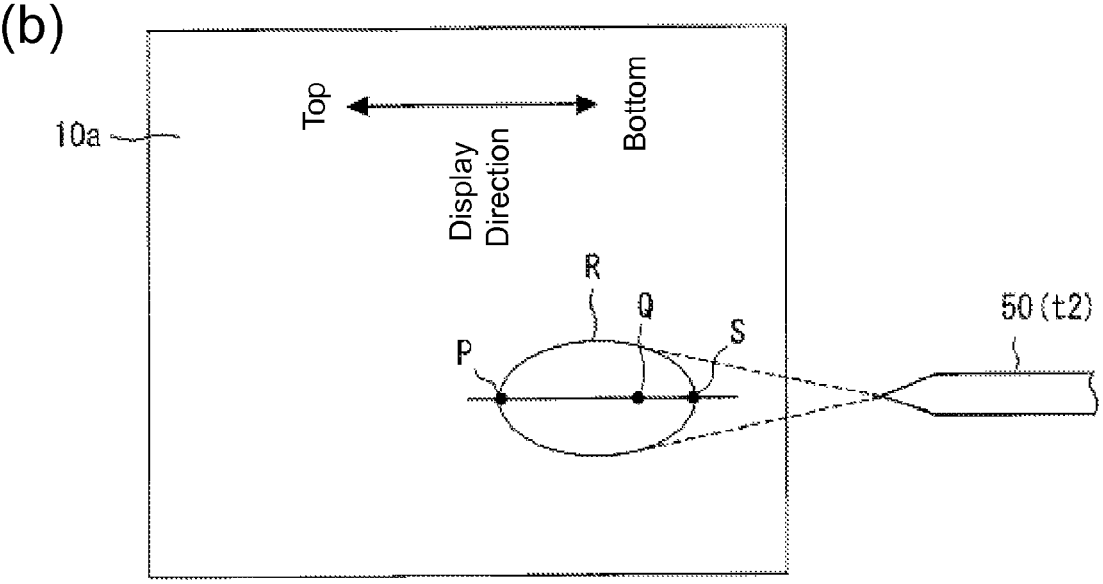

Next, a method of detecting a temporal change of the laser pointer 50 will be explained below with reference to FIGS. 7 and 8. Here, a case where the laser pointer 50 is moved from the position shown in FIG. 8(*a*) to the position shown in FIG. 8(*b*) between the time of the first scan (t1) and the time of the second scan (t2) will be explained as an example. FIGS. 8(*a*) and 8(*b*) are schematic plan views of the image display surface 10*a* of the liquid crystal display device 10.

First, in the first scan (time t1), the above-mentioned steps from S11 to S20 shown in FIG. 7 are performed, and it is determined that the laser pointer 50 is located on the bottom side of the sheet of paper in FIG. 8(*a*) and that the laser light was radiated in the bottom-to-top direction on the sheet of paper. As a result, the display direction is set such that the top side of the display image comes to the top side of the sheet of paper, and the bottom side of the display image comes to the bottom side of the sheet of paper.

Next, in the second scan (time t2), the respective steps from S11 to S20 are repeated. Here, because the closest circumference point S has moved to the right side of the sheet of paper in FIG. 8(*b*) relative to the center of gravity Q in the radiation region R, it is determined that the laser pointer 50 is located on the right side of the sheet of paper and that the laser light was radiated in the right-to-left direction on the sheet of paper. As a result, the display direction is switched such that the top side of the display image comes to the left side of the sheet of paper and the bottom side of the display image comes to the right side of the sheet of paper.

By conducting the above-mentioned processes, the display direction switching system 1 of the present embodiment can switch the display direction of the display image in accordance with the radiation direction of the laser light emitted from the laser pointer 50. This way, the radiation direction of the laser light emitted from the laser pointer 50 and the display direction of the display image can be made to coincide with each other, for example. That is, regardless of the direction from which the user of the laser pointer 50 uses the liquid crystal display device 10, the display image can always be displayed toward the user. As described above, in the present liquid crystal display device 10, the display direction of the display image can automatically be switched without using a selector switch (see FIGS. 14 and 15) or the like, which was required in the conventional configuration, and as a result, the configuration of the liquid crystal display device can be simplified.

Figure 9:
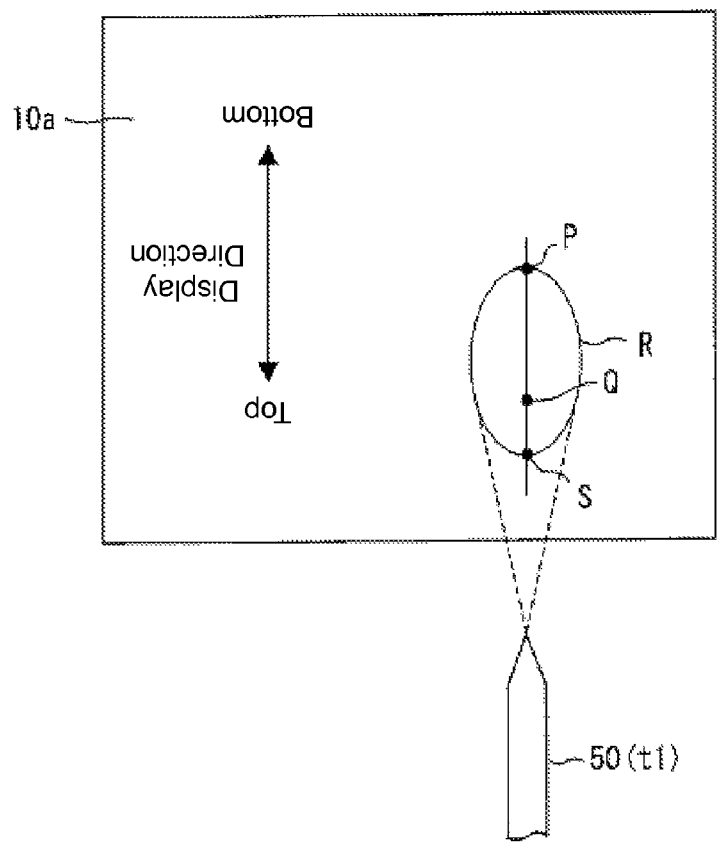
FIG. 9(a) is a schematic diagram showing another manner of switching a display direction with a laser pointer at a time t1 in the display direction switching system of Embodiment 1.
FIG. 9(b) is a schematic diagram showing another manner of switching a display direction with a laser pointer at a time t2 in the display direction switching system of Embodiment 1.
Figure 9:
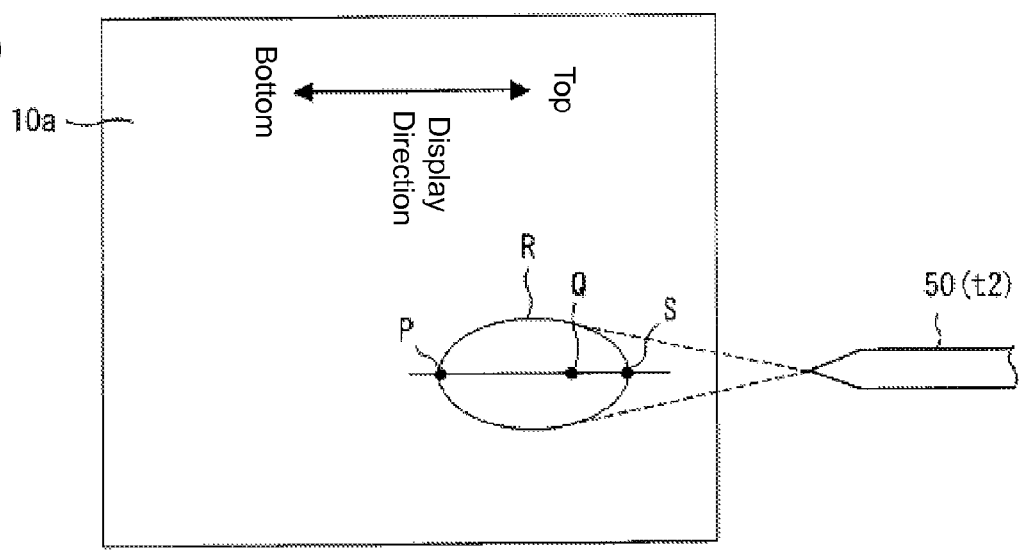

Alternatively, as shown in FIGS. 9(*a*) and 9(*b*), the display image may be displayed toward the side opposite to the user holding the laser pointer 50. This configuration is suitable for a case where another person is present at a position facing the user of the laser pointer 50, and the display image is to be viewed by that person, for example.

As described above, a relationship between the radiation direction of the laser light and the display direction of the display image is not limited to a specific relationship, and can be set in accordance with the usage of the liquid crystal display device 10. It can also be configured to allow a user to select the display direction of the display image relative to the radiation direction of the laser light. This way, the patterns shown in FIGS. 8 and 9, for example, can be selected interchangeably with each other.

In the present embodiment, the area sensor built-in liquid crystal display device in which the photo sensor elements 30 are incorporated in the liquid crystal panel 20 and serve as an area sensor has been described as an example, but the present invention is not necessarily limited to such a configuration. That is, a liquid crystal display device with an area sensor function, which can be obtained by manufacturing an area sensor and the liquid crystal panel 20 as separate components, and by stacking the area sensor and the liquid crystal panel 20 such that the area sensor corresponds to an image display surface of the liquid crystal panel 20, is also an example of the present invention. The display panel is not limited to a liquid crystal panel, and a self-luminance display panel such as a plasma display panel (PDP) or an organic EL panel can also be used.

<Embodiment 2>

Embodiment 2 of the present invention will be described below with reference to FIGS. 10 to 13. For ease of explanation, components that have the same functions as those of the components described in Embodiment 1 above are assigned the same reference characters, and the descriptions thereof are omitted. In this embodiment, the terms defined in Embodiment 1 will be used according to the same definitions unless otherwise specified.

In Embodiment 1 above, the display direction of a display image was switched in accordance with the radiation direction of laser light (infrared light) emitted from the laser pointer 50. Specifically, the display direction of a display image was changed in accordance with a change in the radiation direction of the laser light.

Figure 14:
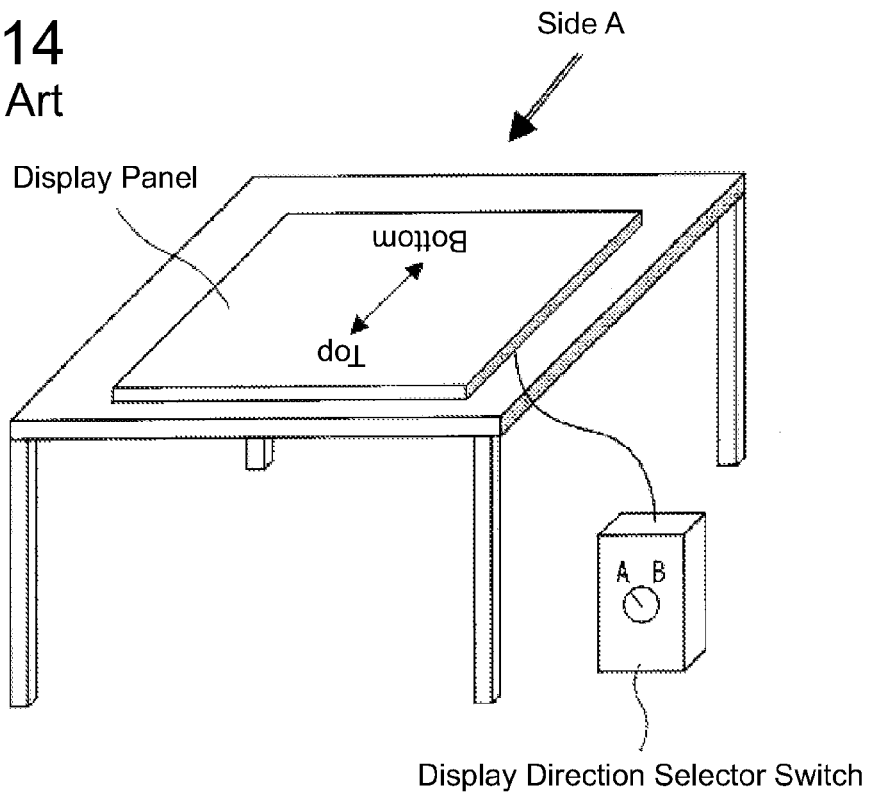
FIG. 14 is a schematic diagram showing a manner of operating a conventional display device from a side A.
Figure 15:
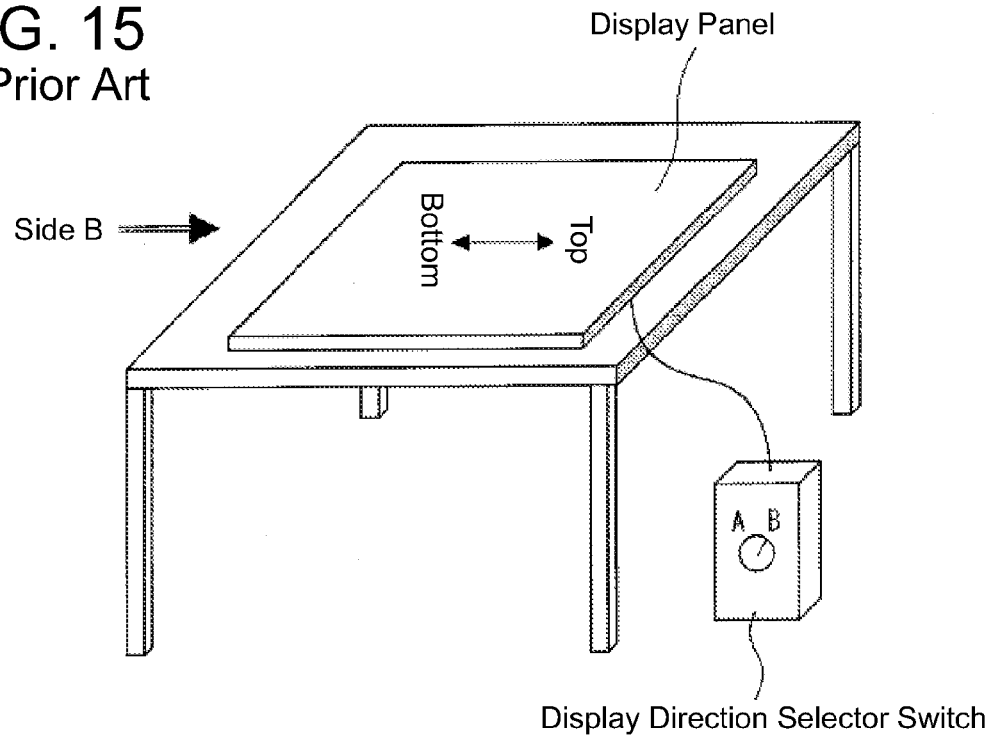
FIG. 15 is a schematic diagram showing a manner of operating the conventional display device from a side B.

As shown in FIGS. 14 and 15, when a liquid crystal display device in which an image display surface of a liquid crystal panel (display panel) is disposed in parallel with a surface of a desk is to be used, the user is more likely to use the device from one of four directions. In such a case, it is more preferable to configure the device such that the display direction switches among the four directions (four ways) where the user is likely to be present than the configuration in which the display direction switches to all directions (360 degrees), following the position of the laser pointer 50 (position of the user) as described in Embodiment 1.

Therefore, this Embodiment 2 is configured such that, when the radiation direction of laser light from the laser pointer 50 is within a prescribed range, the display direction of a display image does not change, and when the radiation direction goes outside the prescribed range, the display direction of the display image is switched.

Figure 10:
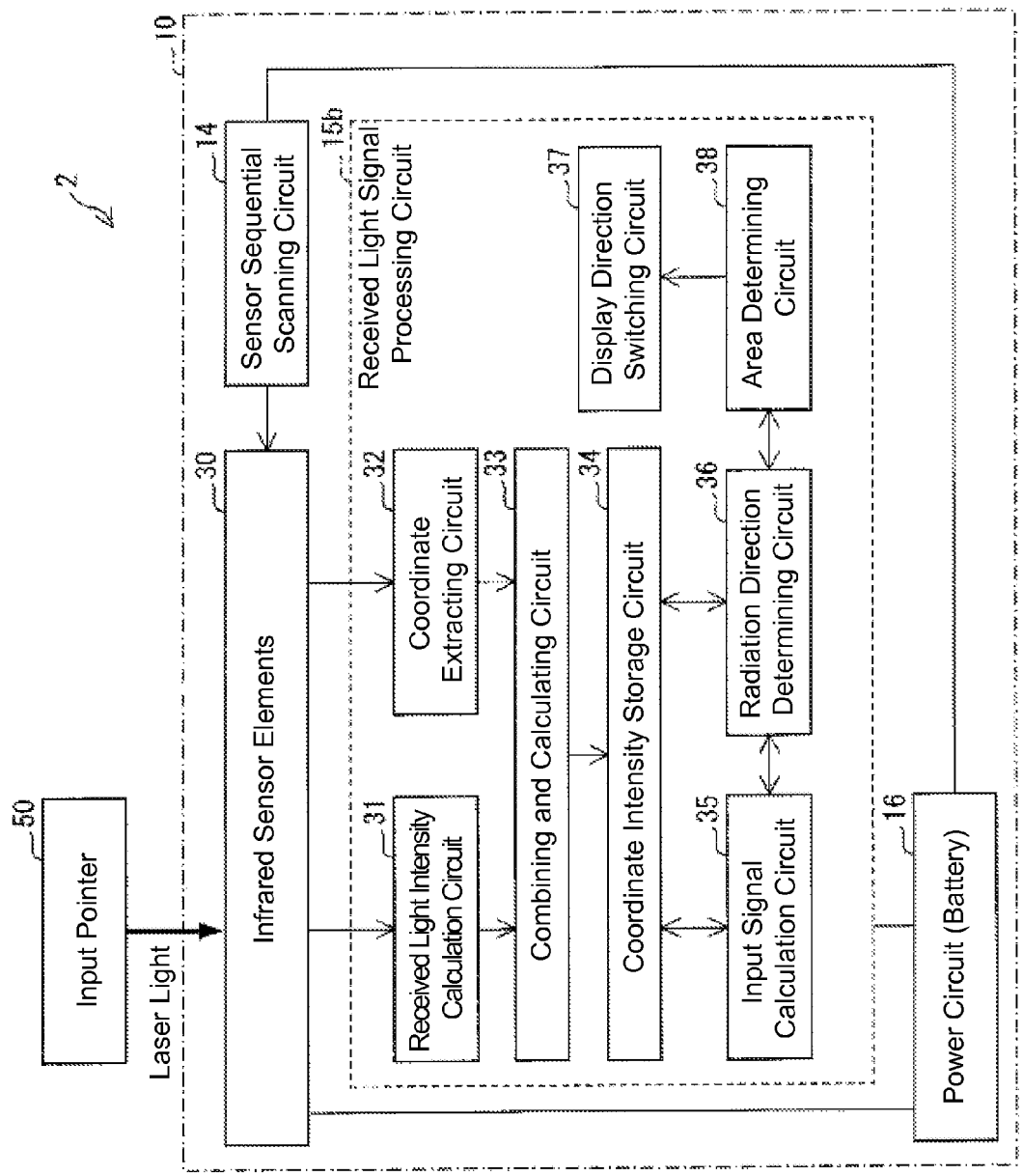
FIG. 10 is a block diagram showing a configuration for switching a display direction in a display direction switching system of Embodiment 2.

FIG. 10 shows a configuration of a display direction switching system 2. A received light signal processing circuit 15b in the liquid crystal display device 10 includes an area determining circuit 38 (region determining section), in addition to the respective configurations included in the received light signal processing circuit 15a (see FIG. 1).

Figure 11:
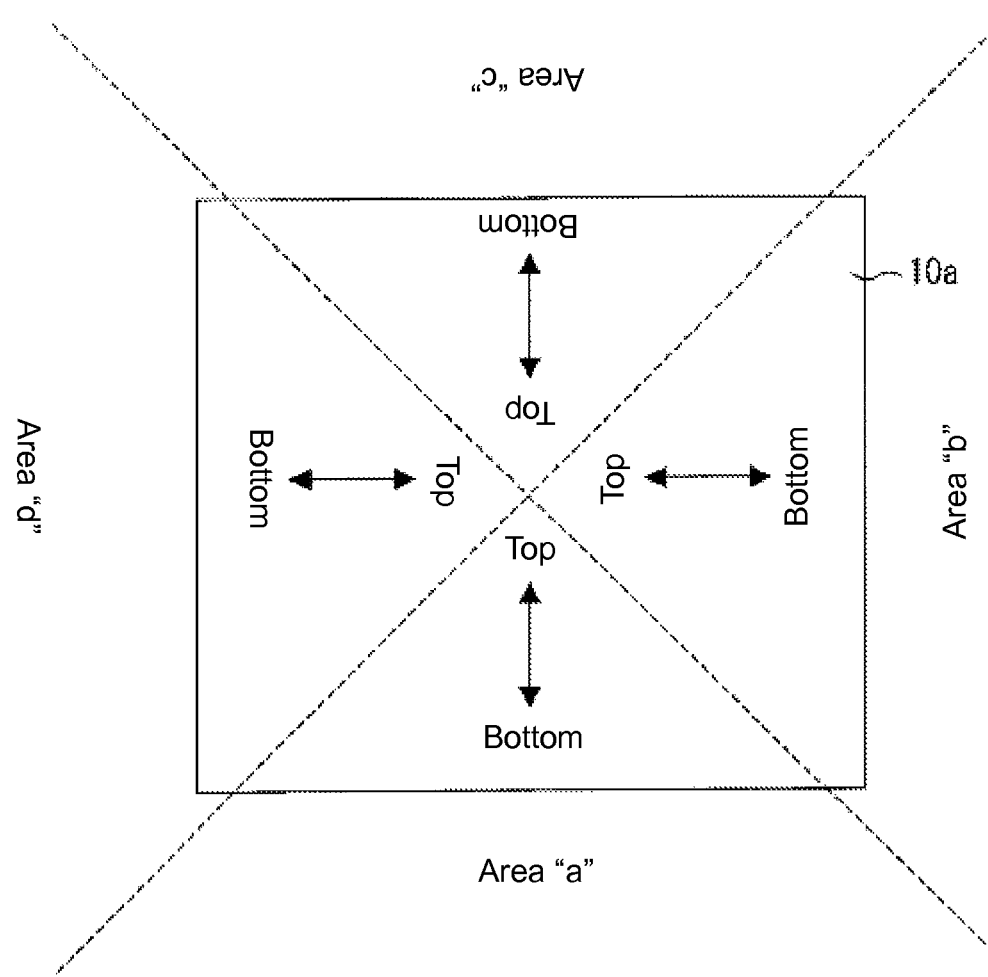
FIG. 11 is a schematic diagram showing divided areas around an image display surface.

The area determining circuit 38 determines, among a plurality of areas that have been divided in advance, an area from which laser light was emitted, based on the radiation direction of laser light emitted from the laser pointer 50, which was determined by the radiation direction determining circuit 36. As shown in FIG. 11, for example, a surrounding area of the image display surface 10a is divided into four areas "a" to "d," and the area determining circuit 38 determines an area from which the laser light of the laser pointer 50 was emitted to the image display surface 10a.

The display direction switching circuit 37 switches the display direction of the display image based on the result determined by the area determining circuit 38. Specifically, as shown in FIG. 11, when laser light of the laser pointer 50 was emitted from the area "a" to the image display surface 10a, the display direction is switched such that the top side of the display image comes to the top side of the sheet of paper and the bottom side of the display image comes to the bottom side of the sheet of paper. When the laser light was emitted from the area "b" to the image display surface 10a, the display direction is switched such that the top side of the display image comes to the left side of the sheet of paper and the bottom side of the display image comes to the right side of the sheet of paper.

Figure 12:
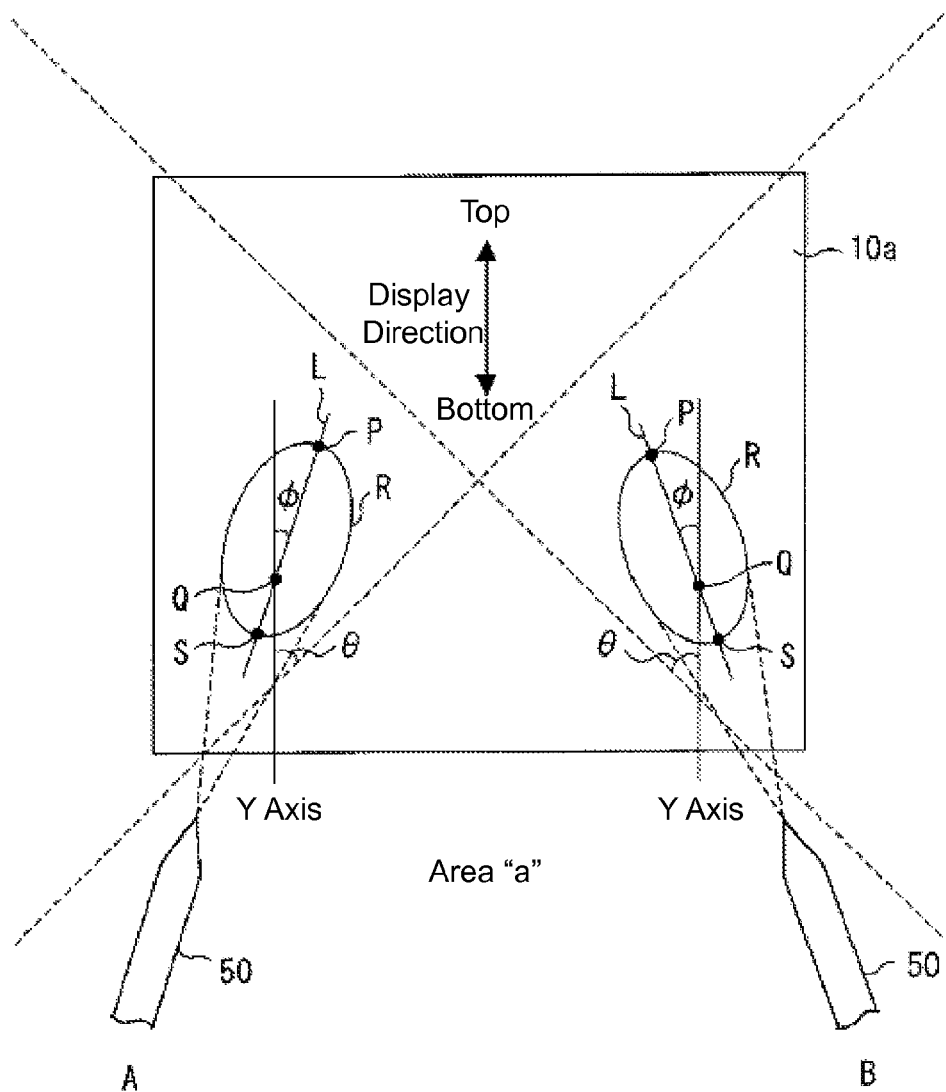
FIG. 12 is a schematic diagram showing laser light of a laser pointer, which is emitted to the image display surface from an area "a."

When the laser light of the laser pointer 50 was emitted from the same area to the image display surface 10a, the display direction switching circuit 37 does not change the display direction of the display image. As shown in FIG. 12, for example, when the laser pointer 50 is placed at the position A and at the position B, and the laser light was emitted from the area "a" to the image display surface 10a both times, the display direction of the display image is set to the same direction. This way, when the user operates the device from a certain position (area "a" in FIG. 12), whether the user holds the laser pointer 50 with his/her left hand (A in FIG. 12) or right hand (B in FIG. 12) in operating the device, the display direction of the display image is not changed, and the display image can be displayed toward the user. As described above, even when the direction of the laser pointer 50 is changed within the same area, the direction of the display image can be maintained the same.

Next, a method of switching the display direction in the display direction switching system 2 of the present embodiment will be described.

As shown in FIG. 6, in the display direction switching system 2, the photo sensor elements 30 in the liquid crystal display device 10 detect laser light (infrared light) emitted from the laser pointer 50 that is located remotely from the image display surface 10a of the liquid crystal display device 10, thereby detecting the radiation direction of the infrared light.

Here, a process flow for switching the display direction of a display image at a point in time (t1) will be explained with reference to FIGS. 6 and 13.

Figure 13:
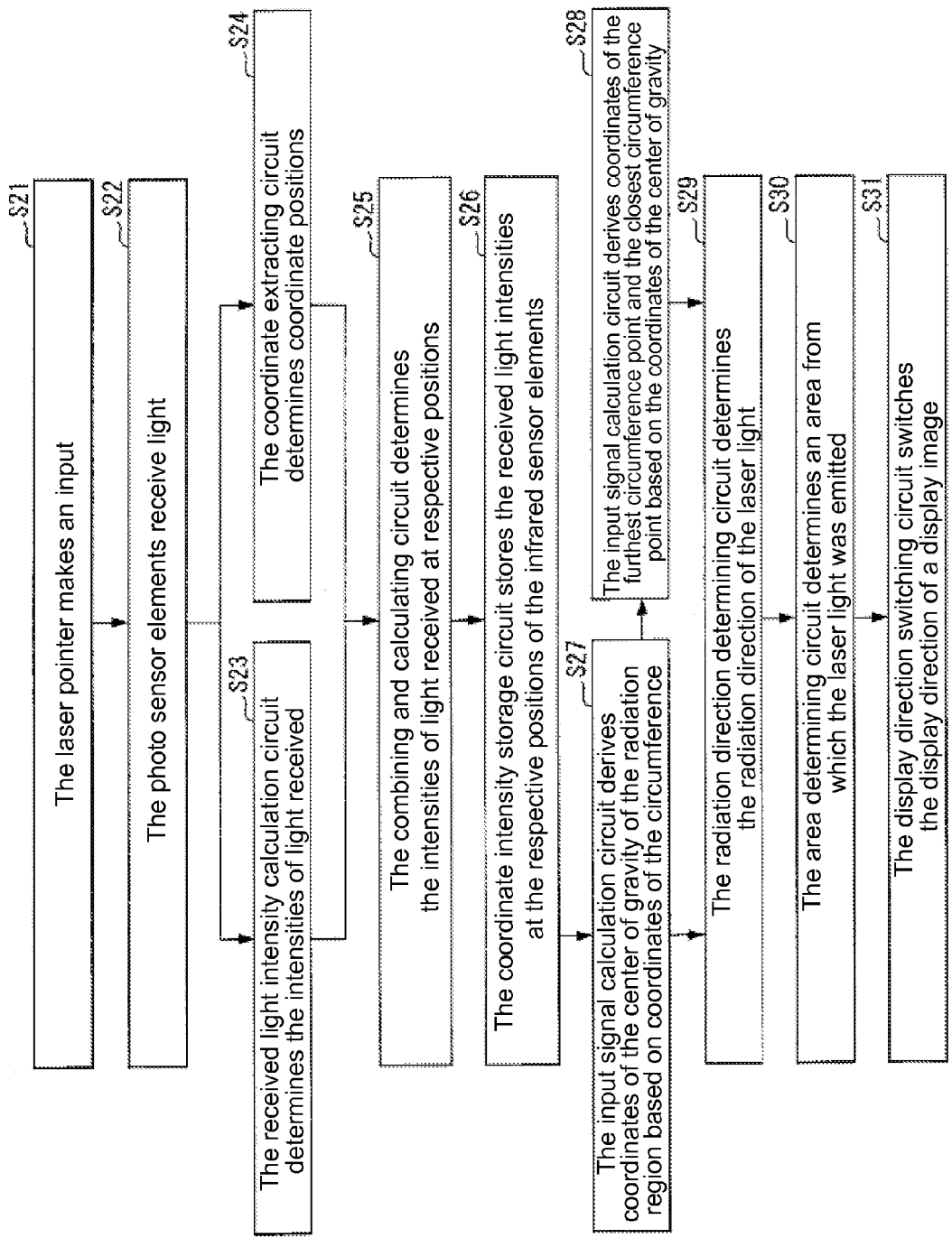
FIG. 13 is a flowchart showing a process flow for switching a display direction in the display direction switching system of Embodiment 2.

As shown in FIG. 6, when laser light (infrared light) is radiated to the image display surface 10a of the liquid crystal display device 10 from the laser pointer 50 at a point in time, the liquid crystal display device 10 receives an input from the laser pointer 50 (step S21) as shown in FIG. 13. At this time, in the liquid crystal display device 10, a sensing operation is performed by the respective photo sensor elements 30 (infrared sensor elements) that are sequentially selected by the sensor sequential scanning circuit 14, and received light signals are generated based on the amount of infrared light that has been radiated (step S22). The received light signals of the respective photo sensor elements 30 obtained in each scan by the sensor sequential scanning circuit 14 are sent to the received light signal processing circuit 15b sequentially.

In the received light signal processing circuit 15b, first, the received light intensity calculation circuit 31 derives the intensities of the received infrared light based on the received light signals that have been provided (step S23). Simultaneously with this step, the coordinate extracting circuit 32 determines coordinate positions from which the respective received light signals were sent as a result of the scan by the sensor sequential scanning circuit 14 (step S24).

Subsequently, the combining and calculating circuit 33 combines the calculation results of the infrared intensities in the received light intensity calculation circuit 31 and the coordinate positions determined by the coordinate extracting circuit 32, and determines the intensities of infrared light at the respective coordinate positions (step S25). The coordinate intensity storage circuit 34 obtains the intensities of light received by the respective photo sensor elements 30, which were derived by the combining and calculating circuit 33, and stores the received light intensities at the respective coordinate positions (step S26).

Next, the input signal calculation circuit 35 derives, based on the information stored in the coordinate intensity storage circuit 34, coordinates of a circumference of a radiation region R formed by a group of photo sensor elements 30 having the received light intensities equal to or greater than a prescribed value (threshold value) among the photo sensor elements 30 arranged in a matrix, and derives coordinates of the center of gravity Q of the radiation region R based on the coordinates of the circumference (step S27). The input signal calculation circuit 35 also derives coordinates of the furthest circumference point P, which is a point furthest from the center of gravity Q in the radiation region R, and coordinates of the closest circumference point S, which is a point that is on the line running through the center of gravity Q and the furthest circumference point P and that is closest to the center of gravity Q in the radiation region R, based on the coordinates of the center of gravity Q in the radiation region R (step S28).

Next, the radiation direction determining circuit 36 determines a radiation direction of the laser light based on the center of gravity Q, the furthest circumference point P, and the closest circumference point S, which were derived by the input signal calculation circuit 35 (step S29). For example, the radiation direction determining circuit 36 determines that the laser pointer 50 is located on the side closer to the closest circumference point S from the center of gravity Q and that the laser light was radiated in a direction from the closest circumference point S toward the furthest circumference point P.

Next, the area determining circuit 38 determines, among the plurality of areas that have been divided in advance, an area from which the laser light was emitted, based on the radiation direction of the laser light determined by the radiation direction determining circuit 36 (step S30). Thereafter, the display direction switching circuit 37 switches the display direction based on the results determined by the area determining circuit 38 (step S31).

The area from which the laser light was emitted can be determined by the area determining circuit 38 as follows. That is, as shown in FIG. 12, when an angle $\phi$ between the Y axis and a line L, which runs through the center of gravity Q, the furthest circumference point P, and the closest circumference point S in the radiation region R of the laser pointer 50, is smaller than a prescribed angle $\theta$, it is determined that the light was emitted from the area "a" or the area "c." When the angle $\phi$ is greater than the prescribed angle $\theta$, it is determined that the light was emitted from the area "b" or the area "d." Whether it is the area "a" or the area "c," or whether it is the area "b" or the area "d" is determined based on the result obtained by the radiation direction determining circuit 36. The prescribed angle $\theta$ is set to 45 degrees in FIG. 12.

According to this configuration, as shown in FIG. 12, for example, because the laser light emitted from the laser pointer 50 is radiated from the direction of the closest circumference point S with reference to the center of gravity Q, and the angle $\phi$ is smaller than the prescribed angle $\theta$ (=45 degrees), it is determined that the laser light of the laser pointer 50 was emitted from the area "a."

The process of switching the display direction in the display direction switching circuit 37 can be performed by referring to a table in which the respective areas (areas "a" to "d") and the display directions (four directions) are correlated, for example.

In Embodiments 1 and 2 above, the method of deriving the center of gravity of the radiation region R on the image display surface 10a was described as an example of the method of determining the position of the laser pointer 50 (radiation direction of laser light), but the present invention is not limited to such, and a method of deriving coordinates of a point that received the highest light intensity (peak coordinates) among the respective received light intensities in the radiation region R may be employed, for example. Below, a case where the peak coordinates are used in the configuration of Embodiment 1 will be briefly explained.

The received light intensity calculation circuit 31 derives intensities of infrared light from the laser pointer 50, which was received by the respective photo sensor elements 30, based on the received light signals (current values that correspond to the intensities of the received light) sent from the respective photo sensor elements 30.

The coordinate extracting circuit 32 extracts positions of the respective photo sensor elements 30 that are sequentially selected by the sensor sequential scanning circuit 14 on the matrix array, i.e., respective coordinate positions on the plane.

The combining and calculating circuit 33 combines the intensities of infrared light derived by the received light intensity calculation circuit 31 and the coordinate positions extracted by the coordinate extracting circuit 32, and derives intensities of received infrared light at the respective coordinate positions, respectively.

The coordinate intensity storage circuit 34 obtains the intensities of the light received by the respective photo sensor elements 30, which were derived by the combining and calculating circuit 33, and stores the intensities of the received light at the respective coordinate positions.

The input signal calculation circuit 35 derives, based on the information stored in the coordinate intensity storage circuit 34, the position of the peak coordinates of the received light intensities and the received light intensity at the peak coordinates. In addition to the peak coordinates, the input signal calculation circuit 35 derives coordinates of the furthest circumference point, which is a point that is furthest from the peak coordinates in the radiation region, and coordinates of the closest circumference point, which is a point that is on the line running through the peak coordinates and the furthest circumference point and that is closest to the peak coordinates in the radiation region.

The radiation direction determining circuit 36 determines a radiation direction of infrared light emitted from the laser pointer 50 based on the peak coordinates and the respective sets of coordinates of the furthest circumference point and the closest circumference point, which were derived by the input signal calculation circuit 35. Specifically, in a plan view of the image display surface 10a, it is determined that the laser pointer 50 is located on the side closer to the closest circumference point from the peak coordinates (on the extended line of the line running through the peak coordinates and the closest circumference point) and that the laser light was radiated in a direction from the closest circumference point toward the furthest circumference point.

The display direction switching circuit 37 switches the display direction of the display image based on the result determined by the radiation direction determining circuit 36. Specifically, the display direction is switched such that the furthest circumference point comes to the top side of the display image, and the closest circumference point comes to the bottom side, for example. Alternatively, the display direction may be switched such that the furthest circumference point comes to the bottom and the closest circumference point comes to the top.

According to the display direction switching system of the present invention, the display direction of a part of the display image can be selectively switched. Therefore, in a display device performing a stereoscopic display, for example, it is possible to turn or move a part of an image selected by an input pointer.

The present invention is not limited to the respective embodiments described above, and various modifications can be made without departing from the scope defined by the claims. That is, techniques appropriately modified within the scope defined by the claims and embodiments that can be obtained by combining the techniques described in different embodiments are also included in the technological scope of the present invention.

Industrial Applicability

The display direction switching system of the present invention can be suitably used when a display device is operated from unspecified positions, in particular.

DESCRIPTIONS OF REFERENCE CHARACTERS

1 display direction switching system
2 display direction switching system 10 liquid crystal display device (display device)
10a image display surface
14 sensor sequential scanning circuit
15a received light signal processing circuit
15b received light signal processing circuit
30 photo sensor element (S)
31 received light intensity calculation circuit (received light intensity detecting section)
32 coordinate extracting circuit (coordinate detecting section)
33 combining and calculating circuit (coordinate and intensity combining section)
34 coordinate intensity storage circuit
35 input signal calculation circuit (input position detecting section)
36 radiation direction determining circuit (radiation direction determining section)
37 display direction switching circuit (display direction switching section)
38 area determining circuit (region determining section)
50 laser pointer (input pointer)

The invention claimed is:

1. A display device having a function of detecting a position at which light emitted from an input pointer was inputted on an image display surface of a display panel,
wherein a display direction of a display image in the display panel is switched based on a radiation direction of light emitted from the input pointer, and
wherein the display device comprises:
a plurality of photo sensor elements arranged in a matrix so as to correspond to the image display surface of the display panel;
a coordinate detecting section that detects positions on an array of the respective photo sensor elements arranged in a matrix where an input from the input pointer was received;
a received light intensity detecting section that detects intensities of light received by the photo sensor elements;
a coordinate and intensity combining section that derives intensities of the received light at respective coordinate positions by combining coordinates of input positions, which were obtained by the coordinate detecting section, and the intensities of light received at the coordinates, which were obtained by the received light intensity detecting section;
an input position detecting section that derives coordinates of a center of gravity in a radiation region of light on the image display surface based on information of the received light intensities obtained by the coordinate and intensity combining section;
a radiation direction determining section that determines a radiation direction of light emitted from the input pointer based on the coordinates derived by the input position detecting section; and
a display direction switching section that switches a display direction of a display image based on the radiation direction of light, which was obtained by the radiation direction determining section.

2. The display device according to claim 1, wherein the photo sensor elements are infrared sensor elements that detect infrared light.

3. The display device according to claim 1, wherein the input position detecting section determines said radiation region as a region formed by a group of coordinates where the received light intensities, which were obtained by the coordinate and intensity combining unit, are equal to or greater than a threshold value.

4. A display direction switching system, comprising:
the display device according to claim 1; and
an input pointer that performs an input by radiating light to said display device.

5. A display device having a function of detecting a position at which light emitted from an input pointer was inputted on an image display surface of a display panel,
wherein a display direction of a display image in the display panel is switched based on a radiation direction of light emitted from the input pointer, and
wherein the display device comprises:
a plurality of photo sensor elements arranged in a matrix so as to correspond to the image display surface of the display panel;
a coordinate detecting section that detects positions on an array of the respective photo sensor elements arranged in a matrix where an input from the input pointer was received;
a received light intensity detecting section that detects intensities of light received by the photo sensor elements;
a coordinate and intensity combining section that derives intensities of the received light at respective coordinate positions by combining coordinates of input positions, which were obtained by the coordinate detecting section, and the intensities of light received at the coordinates, which were obtained by the received light intensity detecting section;
an input position detecting section that derives coordinates of a center of gravity in a radiation region of light on the image display surface based on information of the received light intensities obtained by the coordinate and intensity combining section;
a radiation direction determining section that determines a radiation direction of light emitted from the input pointer based on the coordinates of the center of gravity, which were derived by the input position detecting section;
a region determining section that determines, among a plurality of regions that have been divided in advance, a region from which light of the input pointer was emitted, based on the radiation direction of light, which was determined by the radiation direction determining section, when a surrounding area of the display panel is divided into prescribed regions; and
a display direction switching section that switches a display direction of a display image based on a result obtained by the region determining section.

6. The display device according to claim 5, wherein the photo sensor elements are infrared sensor elements that detect infrared light.

7. A display direction switching system, comprising:
the display device according to claim 5; and
an input pointer that performs an input by radiating light to said display device.

8. A display device having a function of detecting a position at which light emitted from an input pointer was inputted on an image display surface of a display panel,
wherein a display direction of a display image in the display panel is switched based on a radiation direction of light emitted from the input pointer, and
wherein the display device comprises:

a plurality of photo sensor elements arranged in a matrix so as to correspond to an image display surface of the display panel;

a coordinate detecting section that detects positions on an array of the respective photo sensor elements arranged in a matrix where an input from the input pointer was received;

a received light intensity detecting section that detects intensities of light received by the photo sensor elements;

a coordinate and intensity combining section that derives intensities of the received light at respective coordinate positions by combining coordinates of input positions, which were obtained by the coordinate detecting section, and the intensities of light received at the coordinates, which were obtained by the received light intensity detecting section;

an input position detecting section that derives coordinates at which a highest light intensity was received, based on information of the received light intensities obtained by the coordinate and intensity combining section;

a radiation direction determining section that determines a radiation direction of light emitted from the input pointer based on the coordinates of the center of gravity, which were obtained by the input position detecting section; and a display direction switching section that switches a display direction of a display image based on the radiation direction of light, which was obtained by the radiation direction determining section.

9. The display device according to claim 8, wherein the photo sensor elements are infrared sensor elements that detect infrared light.

10. A display direction switching system, comprising:

the display device according to claim 8; and an input pointer that performs an input by radiating light to said display device.

* * * * *